United States Patent [19]
Marandi

[11] Patent Number: 5,635,068
[45] Date of Patent: Jun. 3, 1997

[54] COMBINATION CENTRIFUGAL SEPARATOR FOR AIR AND SOLIDS

[75] Inventor: Ali Marandi, Irvine, Calif.

[73] Assignee: Griswold Controls, Irvine, Calif.

[21] Appl. No.: 399,811

[22] Filed: Mar. 7, 1995

[51] Int. Cl.⁶ .................................................. B01D 21/26
[52] U.S. Cl. .................. 210/512.1; 210/787; 209/715; 209/721; 209/725; 209/733; 55/459.1
[58] Field of Search .................... 210/512.1; 209/715, 209/721, 725, 733; 55/459.1

[56] References Cited

U.S. PATENT DOCUMENTS

| | | | |
|---|---|---|---|
| 4,305,825 | 12/1981 | Laval, Jr. | 210/512.1 |
| 5,368,735 | 11/1994 | Ford | 210/512.1 |
| 5,451,318 | 9/1995 | Moorehead | 210/512.1 |

*Primary Examiner*—David A. Reifsnyder
*Attorney, Agent, or Firm*—Lyon & Lyon LLP

[57] ABSTRACT

A combination centrifugal separator for air and solids has a cylindrical vessel with cylindrical side wall and closing end walls, a vortex finder internally and coaxially disposed within the vessel, an inlet mounted on the vessel in a direction tangential to the periphery of the cylindrical side wall, primary and secondary spin plates coaxially disposed within the vessel, a plurality of vane-shaped ribs connecting the primary and secondary spin plates to the vessel, and a plurality of chambers, i.e., an air collection chamber, a spin chamber and a solids accumulation chamber internally disposed within the vessel. The secondary spin plate preferably is perforated. In operation, contaminated and aerated water enters the vessel and due to the cylindrical wall and gravity, spirals downwardly, until reaching the primary spin plate, whereupon clean water and lighter constituents reverse direction and exit the vessel through the vortex finder. Heavier constituents, however, are centrifugally urged out of the downwardly spiraling flow and, thus, gravitationally descend downwardly in the vessel to the solids accumulation chamber, wherein the heavy constituents are periodically purged through a purge outlet by opening a valve. Air bubbles, on the other hand, tend to rotate and ascend upwardly into the air collection chamber, wherein they can be vented through an air vent by opening up a valve.

20 Claims, 4 Drawing Sheets

COMBINATION CENTRIFUGAL SEPARATOR FOR AIR AND SOLIDS

FIELD OF THE INVENTION

This invention relates to separating devices, and more particularly to a centrifugal separating device that facilitates separation of solids and air from a fluid such as water.

BACKGROUND OF THE INVENTION

Centrifugal separators have been employed for several decades to separate heavy particles from a lighter medium such as solids from contaminated liquids, i.e., water. In the conventional centrifugal separators, the contaminated water enters a cylindrical vessel through a tangential inlet orifice and is forced to spin by an inner surface of revolution in the cylindrical vessel, which, along with gravity, tends to force the water to flow in a downwardly spiraling motion within the cylindrical vessel. Clean water, as well as particles that are lighter than water, have a tendency to spiral inwardly and downwardly forming an conically shaped flow pattern. The conical flow pattern descends until it reaches a spin plate at which point the clean water and lighter constituents reverse direction and ascend upwardly to exit through a vortex finder axially located in the upper portion of the vessel. The centrifugal force created by the spinning motion of the water substantially prevents heavy particles from exiting through the vortex finder. The centrifugal force tends to force the heavy particles out of the conical flow pattern where the heavy solids gravitationally flow downwardly and accumulate in the bottom portion of the vessel where they are periodically purged.

Although effective in separating out solids from the contaminated water, these conventional centrifugal separators do not have the ability to separate and expel both air and solids from contaminated and aerated water. Removal of solids and air from contaminated and aerated water is essential and useful in a closed loop system such as a hydronic cooling and heating system for a building. Currently, two separate devices, e.g., the conventional centrifugal separator noted above and an air separator, are needed to remove both solids and air from contaminated and aerated water. Therefore, it would be desirable to have a device that is capable of removing both solids and air from contaminated and aerated water.

SUMMARY OF THE INVENTION

A primary objective of the present invention is to provide an improved separator that is capable of removing both solids and air from contaminated and aerated water. The combination centrifugal air and solids separator of the present invention serves to facilitate the removal of both solids and air from contaminated and aerated water.

The combination centrifugal air and solids separator of the present invention comprises a cylindrical vessel having upper and lower end walls and a cylindrical side wall forming an internal surface of revolution. An inlet is mounted horizontally on the vessel in a direction tangential to the periphery of the cylindrical side wall. Disposed internally within the vessel and coaxial with the cylindrical side wall is a vortex finder that comprises a tubular member that extends external to the vessel to act as an outlet for the vessel. Primary and secondary spin plates, forming a spin chamber therebetween, are internally mounted to the vessel by a plurality of vane-shaped ribs. The primary spin plate is disposed in the lower portion of the vessel coaxially with the cylindrical side wall while the secondary spin plate is disposed in the upper portion of the vessel above the tangential inlet coaxially with the cylindrical side wall. A solids accumulation chamber and an air collection chamber are formed internal to the vessel below and above the primary and secondary spin plates, respectively.

In operation, contaminated and aerated water enter the vessel through the tangential inlet, and begin to spin and flow downwardly due to the cylindrical side wall surface of revolution and gravity. Water and lighter constituents tend to flow radially inwardly due to the centrifugal motion and result in a downwardly spiraling conical flow motion within the vessel. Once the water and lighter constituents in the spiraling conical flow reach the primary spin plate they reverse direction and exit the vessel through the vortex finder. The centrifugal force created, however, tends to urge heavier constituents out of the downwardly spiraling conical flow of the water and lighter constituents. Outside the spiraling conical flow, the heavier constituents gravitationally descend downwardly in the vessel through clearances between the primary spin plate and the cylindrical walls into the solids accumulation chamber. Once in the solids accumulation chamber, the vane-shaped ribs obstruct the continued revolution of the heavier constituents, forcing the heavy constituents to settle at the base of the solids accumulation chamber where the heavy constituents can be purged periodically through a purge outlet formed in the lower end wall of the vessel by opening and closing a ball valve attached to the purge outlet.

Air bubbles, on the other hand, upon entering the vessel tend to rotate and ascend upwardly and come in contact with the secondary spin plate. The air bubbles then pass through the clearances between the secondary spin plate and the vortex finder, and the cylindrical side wall, into the air collection chamber. The vane-shaped ribs obstruct the revolution of the air bubbles tending to cause them to settle in the top of the air collection chamber, wherein the air bubbles can be periodically vented through an air vent formed in the upper end wall of the vessel by opening a valve attached to the air vent.

Further objects and advantages of the present invention will become apparent from a consideration of the drawings and ensuing description.

DESCRIPTION OF THE PRIOR ART

Figure 1:
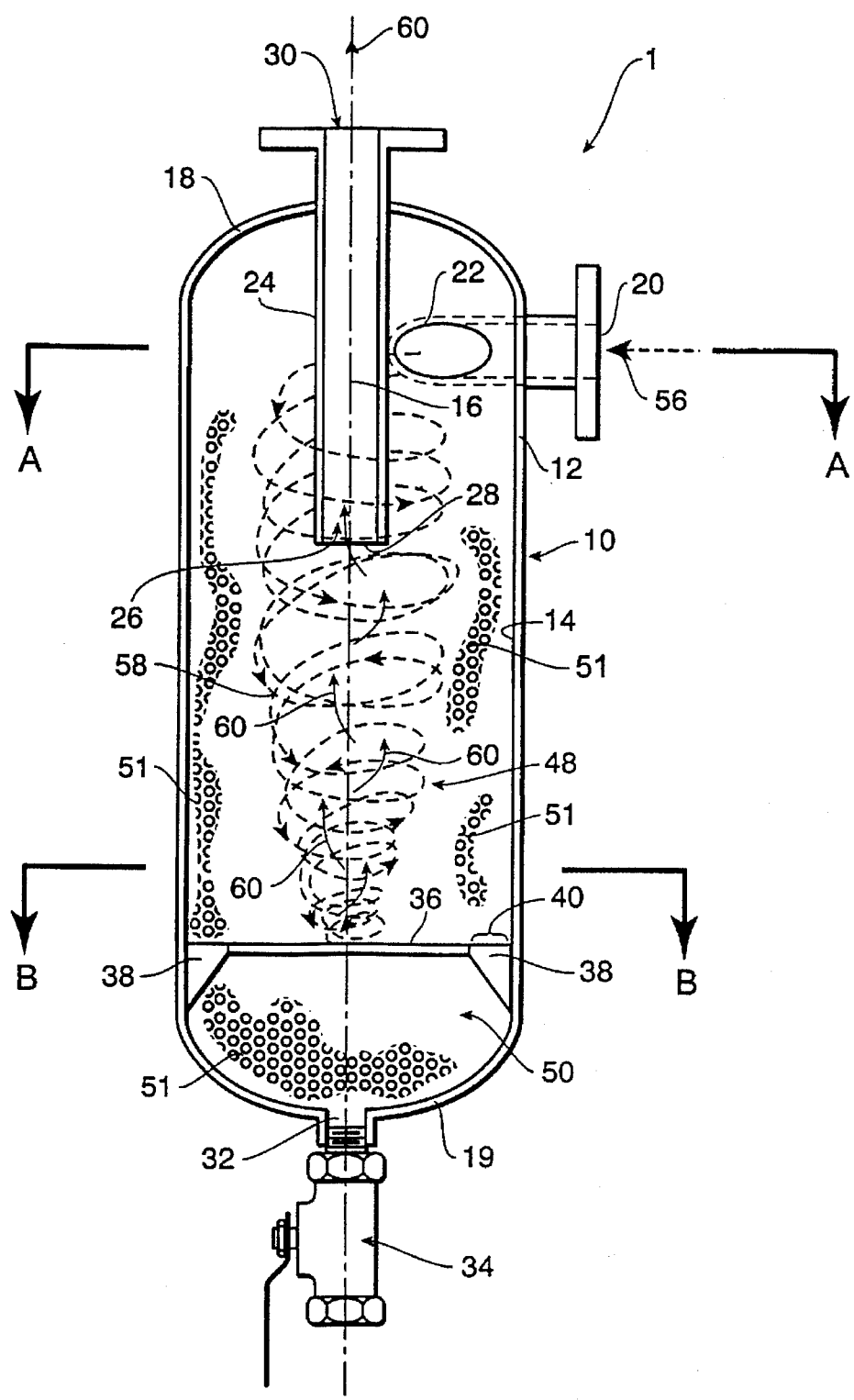
FIG. 1 is a cross-sectional view of a conventional centrifugal separator of the prior art.

Referring now in detail to FIG. 1, therein illustrated is a conventional centrifugal solids separator 1 known in the art. The centrifugal solids separator 1 includes a cylindrical vessel 10 having a cylindrical side wall 12 and an axis 16 which is the longitudinal axis of the separator 1. The side wall 12 provides a cylindrical inner surface 14 which acts as a surface of revolution about the axis 16. The upper and lower ends of the vessel are enclosed by an upper end wall 18 and a lower end wall 19 connected to the side wall 12 of the vessel 10.

Figure 4:
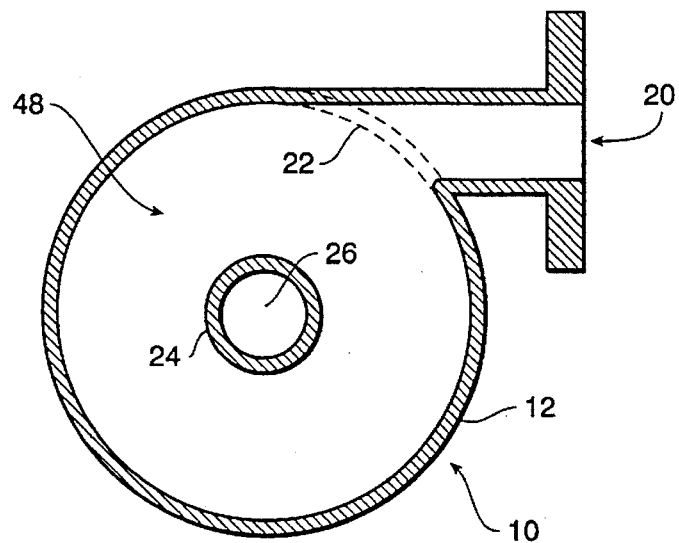
FIG. 4 is a cross-sectional view along a line A—A in FIGS. 1–3.

A horizontal, tubular inlet 20 is mounted on the upper portion of the vessel 10 nearly adjacent to the upper end wall 18. The inlet 20 extends through the side wall 12 and opens to the interior of the vessel 10 at a tangential inlet orifice 22 in a direction tangential to the periphery of the cylindrical side wall 12 of the vessel 10, as shown in more detail in FIG. 4. A vortex finder 24 having a cylindrical vortex finder tube 26 coaxially extends along the axis 16 through the upper end wall 18, from the exterior of the vessel 10, into the interior of the vessel 10.

Figure 5:
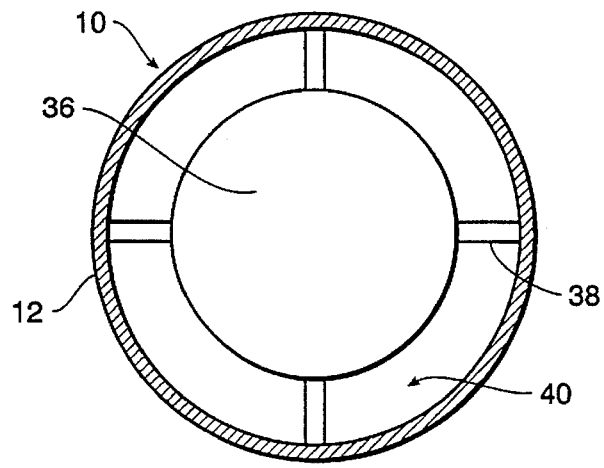
FIG. 5 is a cross-sectional view along a line B—B in FIGS. 1–3.

A circular spin plate 36 is horizontally attached to the side wall 12 by several vaneshaped ribs 8 and is axially located nearly adjacent to the end wall 19 in the lower portion of the vessel 10, as shown in FIGS. 1 and 5. A spin chamber 48 is formed above the spin plate 36, internal to the vessel 10, while a solids accumulation chamber 50, formed internal to the vessel 10, is interposed between the spin plate 36 and the lower end wall 19. A purger outlet 32 is formed in the lower end wall 19 at the base of the accumulation chamber 50. A manual ball valve 34 is connected to the purger outlet 32 to periodically purge solids 51 that have accumulated in the chamber 50 after passing through clearances 40 between the spin plate 36 and the side wall 12, as shown in FIG. 5.

In operation, contaminated water flows through the inlet 20 entering the vessel 10 of the separator 1 through the tangential inlet orifice 22 and is directed in a downward spiraling conical flow about the vortex finder 24 and the axis 16 by the inner surface 14 and gravity. The spiraling conical flow of the water is denoted by the dashed and curvilinearly looped lines 58. The clean water and lighter constituents of the contaminated water tend to swirl in a motion radially directed inwardly as the water descends towards the spin plate 36, as noted by the looped lines 58. Once the clean water and lighter constituents in the spiraling conical flow 58 reach the spin plate 36, the clean water and light constituents reverse direction and ascend upwardly, as denoted by a series of arrows 60. The clean water and lighter constituents exit the separator by entering the vortex finder tube 26 through its downwardly and axially directed entrance 28 and then flowing outwardly and axially from an axial outlet 30 of the vortex finder 24.

The same spiraling flow of the water urges the heavier constituents or solids 51 centrifugally in an outwardly direction. Because the centrifugal force is proportional to the mass and the square of the velocity of the solids in motion, and because the water accelerates with a velocity inversely proportional to the radius from the center axis 16 of the vessel 10, the centrifugal force at the center of the vessel is extremely high. The tremendously high centrifugal force substantially prevents heavy constituents or solids 51 from exiting through the vortex finder 24. Thus, the heavier solids 51 are continually thrown outward from the spiraling flow of the water. As a result, the heavier solids 51 gravitationally descend inside the vessel 10, pass through the clearances 40 between the spin plate 36 and the side wall 12, and accumulate in the solids accumulation chamber 50. The vane-shaped ribs 38 then act to stop the rotation of the solids 51 as they enter the accumulation chamber 50 which results in the solids 51 accumulating in the base of the chamber 50. The solids 51 that accumulate in the chamber 50 are periodically purged by opening the manual ball valve 34 connected to the purger outlet 32. It may be preferable to have an automatic ball valve (not shown) to allow the solids 51 to be purged automatically on a periodic basis.

This conventional construction of the centrifugal solids separator results in substantially purified water exiting the separator. However, this construction does nothing to eliminate air from aerated water and, due to the swirling motion of the water in the upper portion of the vessel 10, effectively re-aerates the water with any air that may tend to ascend out of the downward swirling flow of the water. Thus, it would be desirable to have a device that is also capable of removing air from aerated water.

DESCRIPTION OF THE PREFERRED EMBODIMENT

Figure 2:
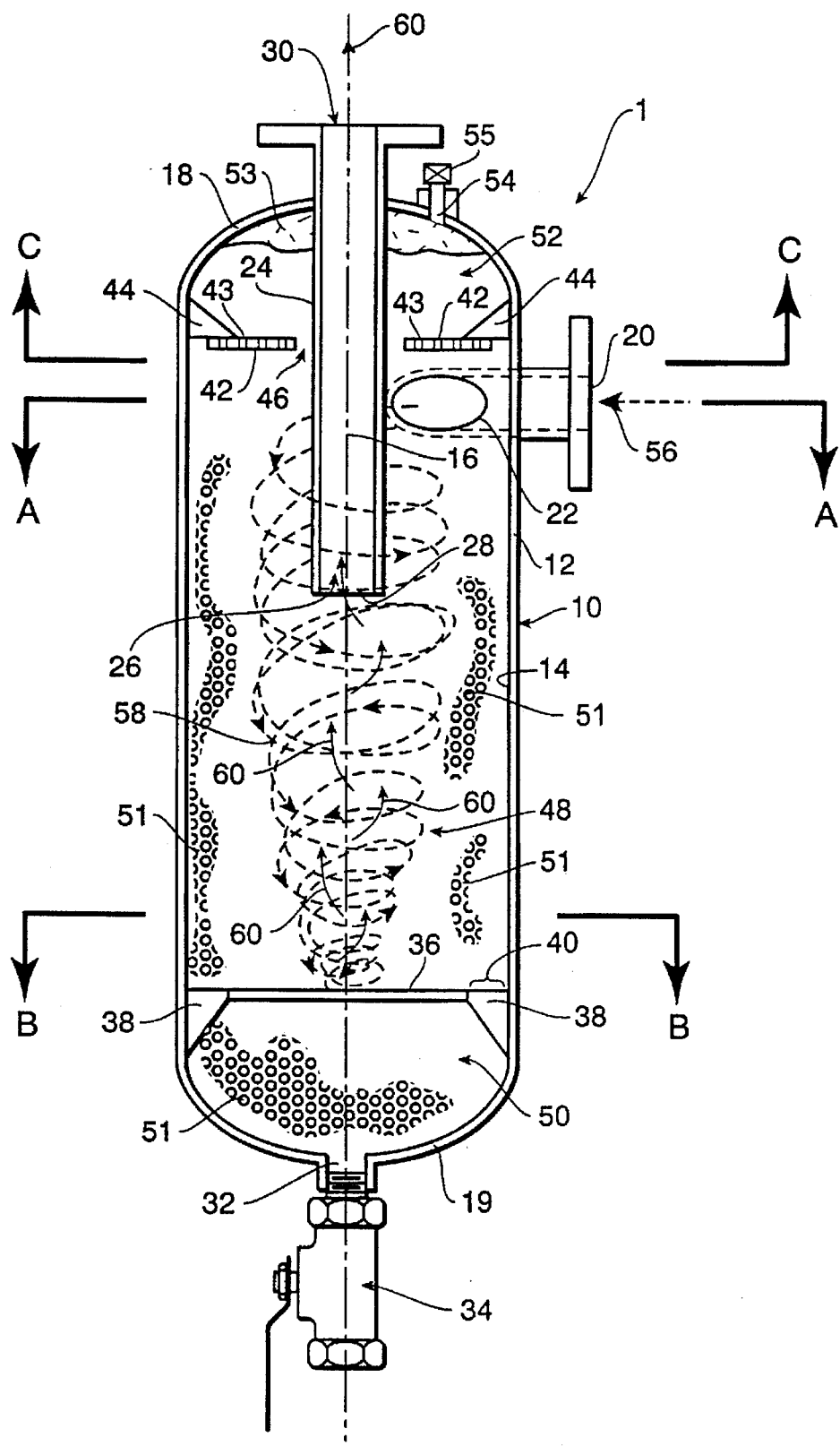
FIG. 2 is a cross-sectional view of an embodiment of the present invention.
Figure 6:
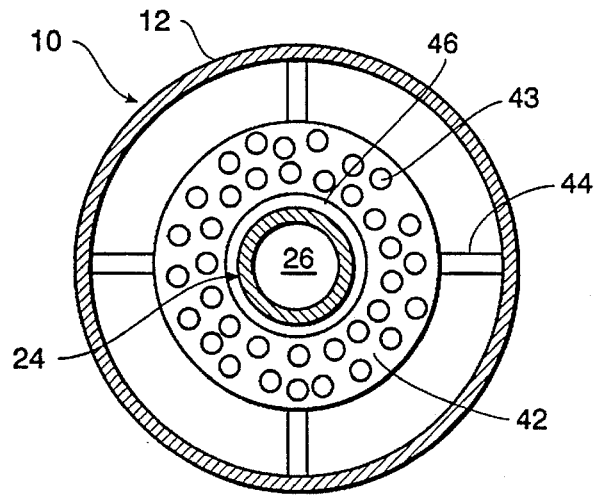
FIG. 6 is a cross-sectional view along a line C—C in FIG. 2.

Referring now in detail to FIG. 2, therein illustrated is an embodiment of a combination centrifugal air and solids separator 2 of the present invention. Like components of FIG. 1 are numbered in like fashion in FIG. 2 and are understood to function substantially the same. Therefore, the noted additions to FIG. 2, and also shown in FIG. 6, comprise an annularly shaped secondary spin plate 42, a series of vane-shaped ribs 44, an air vent 54, and an air vent valve 55.

The secondary spin plate 42 is horizontally attached to the side wall 12, or alternatively (not shown) to the vortex finder 24, by the vane-shaped ribs 44 and is axially disposed over the vortex finder 24 in the upper portion of the vessel 10 above the entrance 28 of the vortex finder tube 26, and also above and nearly adjacent to the tangential inlet orifice 22. As a result, an air collection chamber 52 is formed interposed between the secondary spin plate 42 and the upper end wall 18. Air bubbles 53 tend to collect in the top of the chamber 52 and are able to escape through the air vent 54 formed in the upper end wall 18 by opening the automatic or manual air vent valve 55.

The spin plate 42 preferably is made from perforated material (e.g., a plate with holes 43). Testing has shown that the perforated material prevents spinning air pockets from forming and staying in suspension under the plate 42; without the perforations such spinning air pockets occur under the plate 42.

Figure 3:
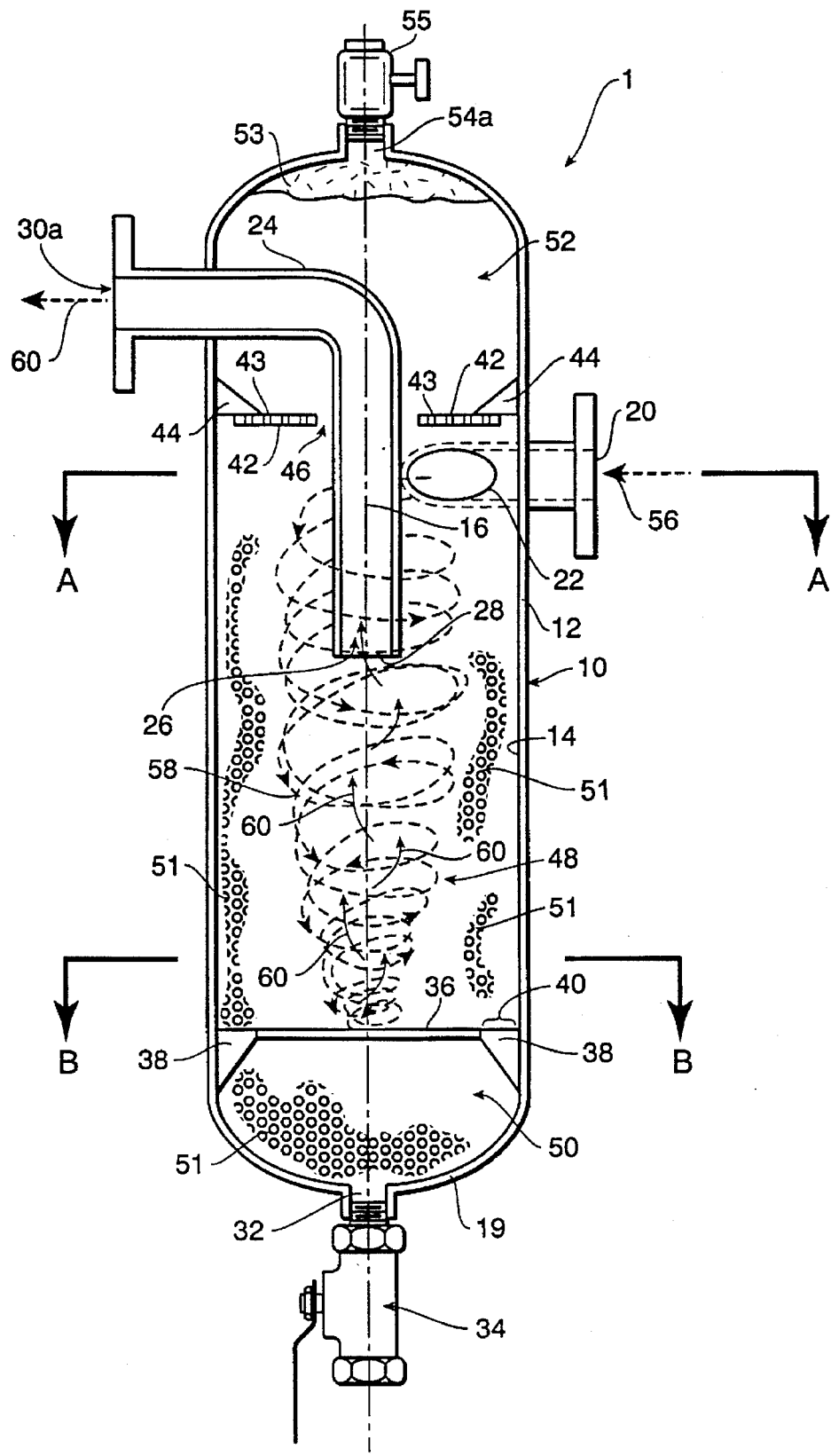
FIG. 3 is a cross-sectional view of an alternative embodiment of the present invention.

Turning to FIG. 3, a construction of an alternative embodiment of a combination centrifugal air and solids separator 3 of the present invention comprises a radially and horizontally oriented outlet 30a to the vortex finder 24 and an air vent 54a that is axially formed, along the axis 16, in the upper end wall 18.

In operation, as noted above, like numbered components operate substantially the same. Therefore, this discussion will be abbreviated and will focus mainly on the operation of the combination centrifugal air and solids separator regarding the additional components in FIGS. 2, 3 and 6. Thus, as aerated water enters the vessel 10 from the inlet 20 through the tangential inlet orifice 22, the air bubbles 53 rotate and rise against the secondary spin plate 42. The air bubbles 53 then enter the air collection chamber 52 through the clearances 46 located between the secondary spin plate 42 and the vortex finder 24, and, between the secondary spin plate 42 and the side wall 12. The vane-shape ribs 44 then act to stop the rotation of the air bubbles 53 as they enter the collection chamber 52 which results in the air bubbles 53 collecting in the top of the chamber 52. The air vent valve 55 can be periodically operated, manually or automatically, to vent the air bubbles 53 out through the air vent 54. As a result, air, as well as solids, is substantially removed from the water system on which the combination centrifugal air and solids separator of the present invention is installed.

Thus, the combination centrifugal air and solids separator of the present invention provides many benefits over the prior art. While the above description contains many specificities, these should not be construed as limitations on the scope of the invention, but rather as an exemplification of one preferred embodiment thereof. Many other variations are possible.

Accordingly, the scope of the present invention should be determined not by the embodiments illustrated above, but by the appended claims and their legal equivalents.

What is claimed is:

1. A combination centrifugal air and solids separator comprising:
   a vessel having an internal surface of revolution and upper and lower end walls,
   a first spin plate mounted within said vessel to separate out solids from a contaminated fluid, and
   a second spin plate mounted within said vessel to separate out air from an aerated fluid, said second spin plate forming an air collection chamber with said surface of revolution and said upper end wall, said upper end wall being continuous with said surface of revolution, said chamber being interposed between said second spin plate and said upper end wall.

2. The separator of claim 1 wherein the second spin plate is perforated.

3. The separator of claim 1, further comprising an inlet attached to said vessel in a tangential direction to the surface of revolution.

4. The separator of claim 3, further comprising a vortex finder disposed within said vessel.

5. The separator of claim 4, wherein said vortex finder further comprises a tubular member internally disposed within said vessel and extending externally to said vessel forming an outlet for said vessel.

6. The separator of claim 4, wherein said second spin plate is substantially annularly shaped, said second spin plate being disposed over said vortex finder above and adjacent said inlet in an upper portion of said vessel.

7. A centrifugal separator comprising:
   a vessel having an internal surface of revolution,
   first and second spin plates,
   first and second plurality of vane-shaped ribs, respectively, connecting said first and second spin plates, respectively, to said vessel,
   a tangential inlet mounted to said vessel in a direction tangential to the surface of revolution of said vessel, and
   a vortex finder disposed within said vessel.

8. The separator of claim 7, wherein said first spin plate is substantially circular and disposed in a lower portion of said vessel coaxially with the surface of revolution of said vessel.

9. The separator of claim 7, wherein second spin plate is perforated and is substantially annularly shaped and disposed in an upper portion of said vessel above and adjacent said tangential inlet and being coaxially located with the surface of revolution of said vessel.

10. The separator of claim 7, wherein said vortex finder comprises a tubular member internally disposed within said vessel coaxially with the surface of revolution of said vessel and extending external to said vessel forming an outlet to said vessel.

11. The separator of claim 7, further comprising a plurality of chambers within said vessel.

12. The separator of claim 11, wherein said plurality of chambers comprises:
    a spin chamber interposed between said first and second spin plates,
    a solids accumulation chamber disposed below said first spin plate, and
    an air collection chamber disposed above said second spin plate.

13. The separator of claim 12, further comprising an air vent formed in said vessel adjacent said air collection chamber.

14. The separator of claim 13, further comprising an automatic or manual valve attached to said air vent.

15. The separator of claim 12, further comprising a purge outlet formed in said vessel adjacent said solids accumulation chamber.

16. The separator of claim 15, further comprising an automatic or manual valve attached to said purge outlet.

17. A combination centrifugal separator for air and solids comprising:
    a substantially cylindrical vessel having a substantially cylindrical side wall and closing upper and lower end walls,
    a vortex finder comprising a tubular member disposed internal to said vessel coaxially with said side wall and extending external to said vessel forming an outlet to said vessel,
    a tangential inlet mounted on said vessel in a direction tangential to said side wall,
    a substantially circular primary spin plate mounted in a lower portion of said vessel and coaxial with said side wall,
    a substantially annularly shaped perforated secondary spin plate mounted above said inlet in an upper portion of said vessel and coaxial with said side wall,
    first and second plurality of vane-shaped ribs, respectively, connecting said primary spin plate and said secondary spin plate, respectively, to said vessel, and
    a plurality of chambers internal to said vessel.

18. The separator of claim 17, wherein said plurality of chambers comprises:
    a spin chamber interposed between said primary spin plate and said secondary spin plate,
    an air collection chamber disposed above said secondary spin plate, and
    a solid accumulation chamber disposed below said primary spin plate.

19. The separator of claim 17, further comprising an air vent with a valve attached thereto formed in said upper end wall and extending from said air collection chamber of said vessel.

20. The separator of claim 17, further comprising a purge outlet with a valve attached thereto formed in said lower end wall and extending from said solid collections chamber of said vessel.

* * * * *